United States Patent Office 3,307,503
Patented Mar. 7, 1967

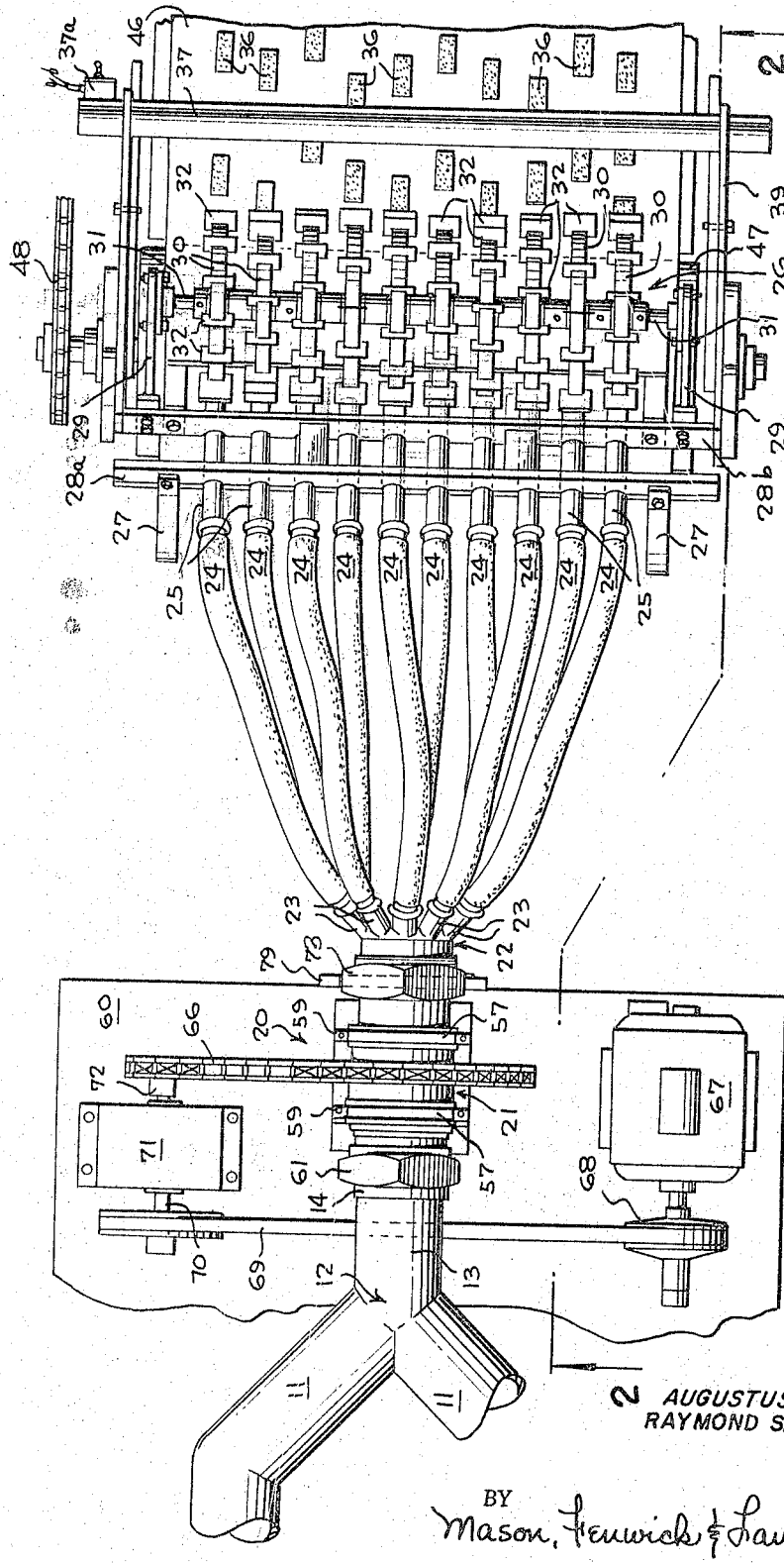

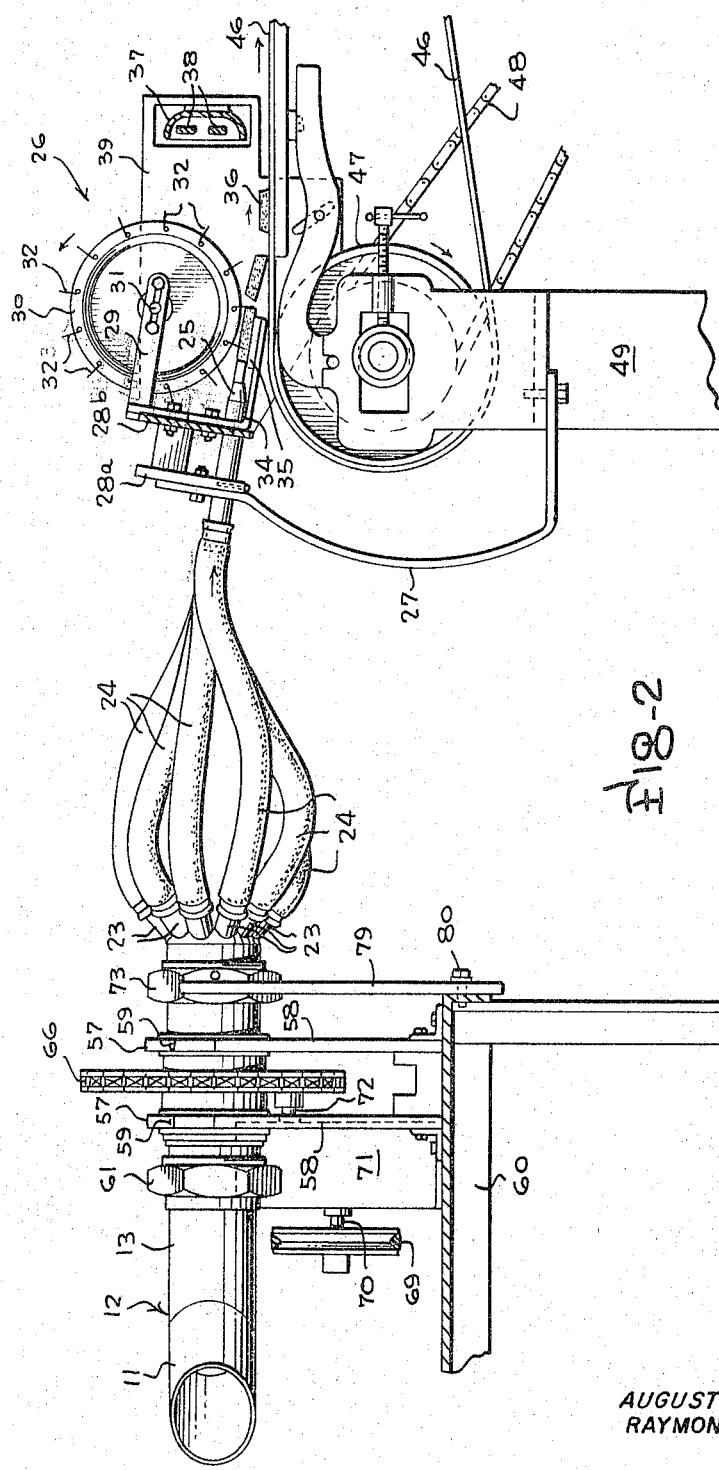

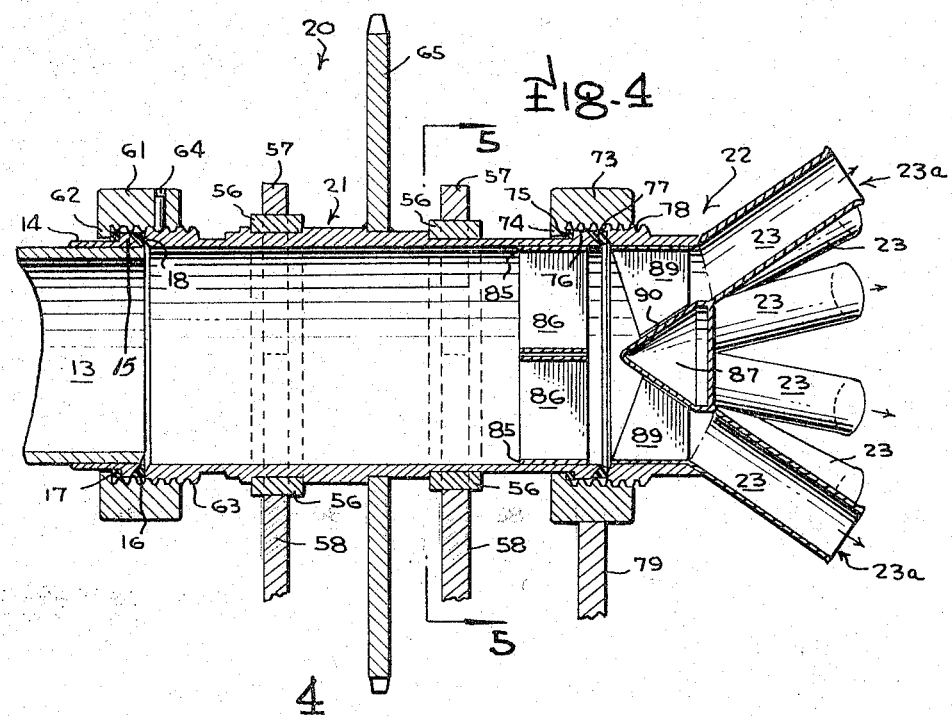
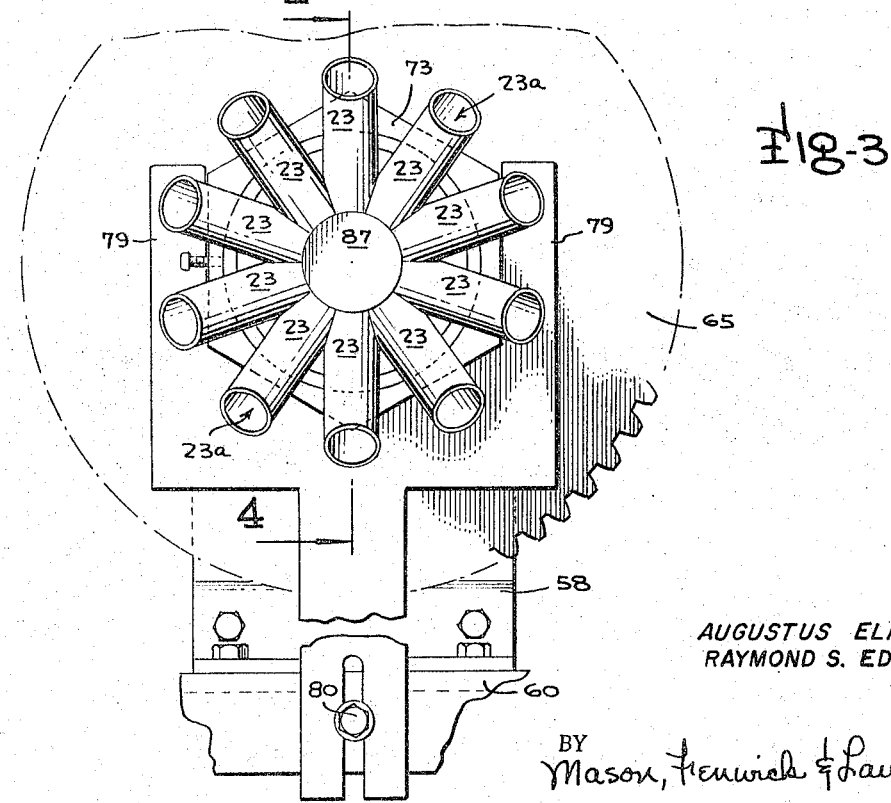

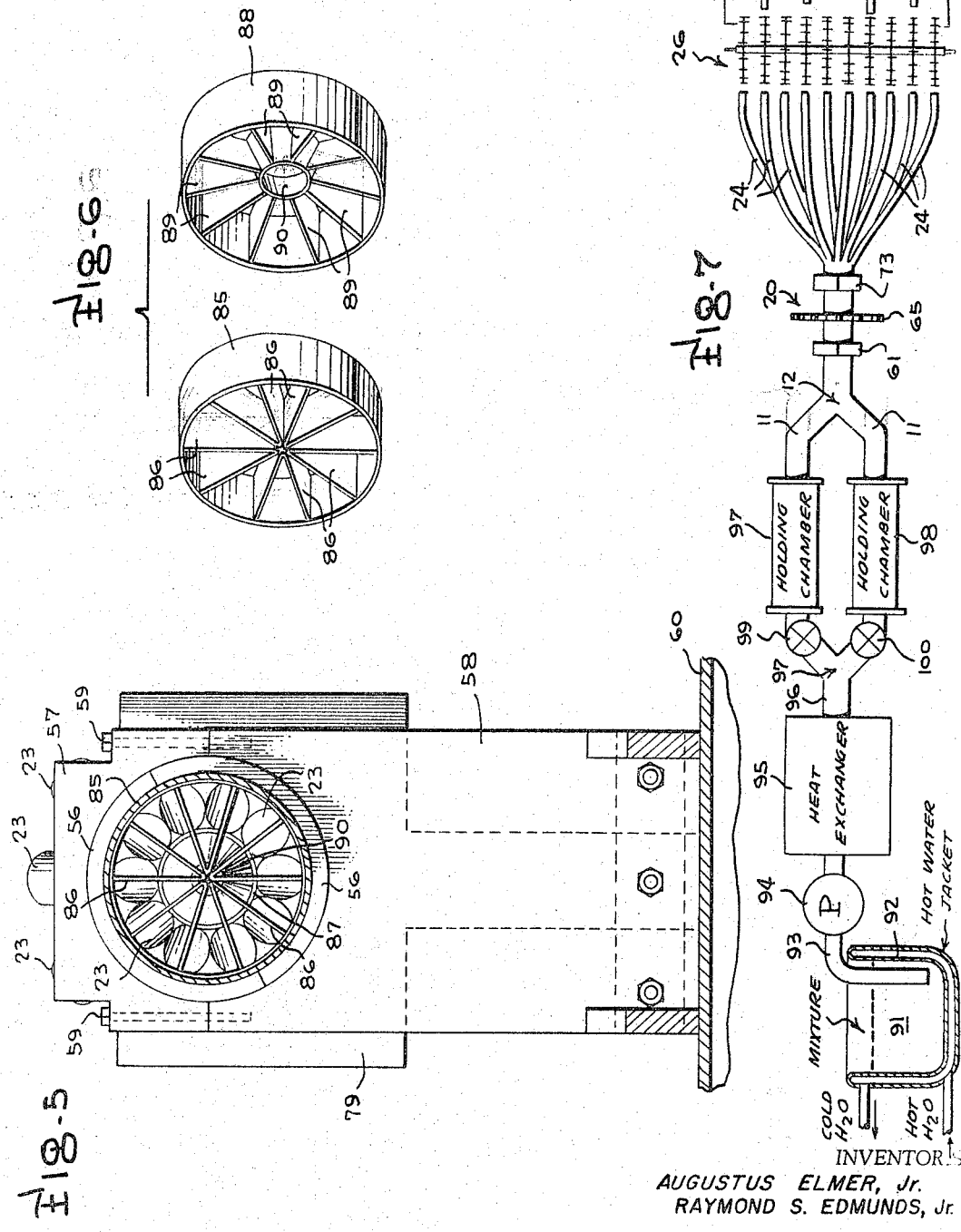

3,307,503
METHOD AND APPARATUS FOR EXTRUDING CANDY BARS
Augustus Elmer, Jr., New Orleans, La., and Raymond S. Edmunds, Jr., San Antonio, Tex., assignors to International Foods, Inc., New Orleans, La., a corporation of Louisiana
Filed July 30, 1964, Ser. No. 386,344
11 Claims. (Cl. 107—69)

This invention relates to a method and apparatus for extruding material in a plastic condition and more particularly to a method and apparatus for obtaining uniform extrusions of a highly abrasive material, such as chocolate candy, which is in a plastic condition, although it is anticipated that the invention will operate equally as well with materials other than chocolate.

Extruding machines found in the prior art generally operate on the principle of a rotating screw closely fitted within a passageway to move the plastic material through a fine mesh screen and thence through a multi-apertured disk in order to thoroughly mix the material before extruding it. These devices depend upon very close tolerances for proper operation and as such will not properly perform with chocolate because of the high abrasive features of the finely ground sugar that is a basic part of the chocolate mixture. Also, the heat generated from the close fitting parts and the heat from the action of the abrasives, will caramelize the candy ingredients and then finally carbonize them at which time the rotary parts will tend to become frozen as to further operation.

Therefore, an object of this invention is the provision of an extrusion machine in which the foregoing disadvantages are overcome.

Another object of this invention is the provision of an extrusion apparatus in which multiple lines may be extruded from a single extrusion head with the product metered and cut to size and conveyed away without any intermediate handling.

An object of this invention is the provision of a novel extruder head having multiple extruding tubes and novel means for obtaining uniform extrusion through the tubes.

It is a further object of this invention to provide a simple, economical method of preparing and extruding abrasive materials in a plastic condition through a multiple discharge extruder head and thereafter metering and cutting the extruded material into predetermined sizes.

Other objects, advantages and capabilities of the invention will become apparent from the following description, taken in conjunction with the accompanying drawings showing only a preferred embodiment of the invention.

FIGURE 1 is a fragmentary top plan view of a portion of the apparatus used in extruding candy bars for the present invention;

FIGURE 2 is a side elevation view of the apparatus showin in FIGURE 1 taken along lines 2—2;

FIGURE 3 is a front elevation view of the extruder assembly and support structure used in the present invention;

FIGURE 4 is a vertical section view of the extruder assembly shown in FIGURE 3 and taken along lines 4—4;

FIGURE 5 is a vertical section view of the extruder assembly shown in FIGURE 3 and taken along lines 5—5;

FIGURE 6 is a perspective view of the revolving and stationary distributing vanes used in the extruder assembly of the invention; and FIGURE 7 is a diagrammatic view of the basic apparatus used in the process of making candy by the present invention.

Referring to the drawings wherein like reference characters designate corresponding parts throughout the several figures and particularly to FIGURES 1 and 2 there is shown the complete extruding apparatus of the present invention which comprises a pair of mixture supply conduits 11 terminating at a Y junction indicated by the numeral 12 at which point the mixture alternately supplied from the conduits merges into a single supply conduit 13. Affixed to the forwardmost end of conduit 13 is a bearing holder flange 14 which has an enlarged outwardly extending portion 15, the end of which is beveled rearwardly as noted by numeral 16. Against the rearward face of the outwardly extending portion 15 is positioned a brass bearing ring 17 and against the beveled edge 16 is positioned a brass thrust washer 18.

Adjacent the supply conduit 13 is the extruder head assembly 20 which comprises two sections, one of which is the rotary distributor 21 and the other is the extruder head 22. Projecting outwardly from the extruder head 22 are a plurality of equally angular spaced extruding tubes 23 which diverge outwardly at an acute angle from the center line axis of the extruder head assembly 20; all of which terminate in a common imaginary vertical plane. Each of the tubes 23 have a longitudinal opening terminating in an extruding orifice 23a. Affixed to each of the extruding tubes 23 is a flexible distributing tube 24 which interconnects the extruding tubes 23 and extruding orifices 23a with a plurality of extruding nozzles 25 which then terminate in adjacent relation with the cutter assembly 26. The cutter assembly 26 is a modification of the cutter described in U.S. Patent No. 2,678,493 issued to R. S. Edmunds, Jr. and comprises upwardly extending support braces 27 which are affixed to and support the tube frames 28a and 28b. The tube support frames 28a and 28b are suitably apertured to receive therein the extruding nozzles 25 which project through the tube frames 28a and 28b and terminate forwardly of frame 28b. Firmly secured to frame 28b is a cutter wheel support 29 which is adapted to support a plurality of cutting wheels 30, each of which are commonly mounted upon a central shaft 31 for independent and free rotation thereon. Suitably affixed about the periphery of the cutting wheels 30 and projecting radially outwardly are cutting blades 32.

Located beneath cutting wheels 30 and supported by a lower projecting arm 34 of the cutting wheel support 29 is an extrusion receiving plate 35 in which there is embedded a suitable electric heating coil (not shown), the purpose of which will be later described. The plate 35 is so located beneath cutter wheels 30 to provide the minimum clearance for blades 32 so that a precise cut will be made through the extruded material, shown herein as elongated candy bars 36.

Forwardly of the cutting wheels 30, and spaced at a suitable distance therefrom, is a heat lamp 37 having heating elements 38 which are adapted to radiate their heat toward the cutting wheels 30 in a manner yet to be described. The lamp 37 is fixedly held in proper relation to the cutting wheels 30 by support member 39 and is adapted to be controlled by a suitable electric switch 37a. Located beneath the cutter assembly 26 and adapted to receive the extrusions coming off of the receiving plate 35 is a conveyor belt 46 driven by conveyor drum 47 which is in turn driven by drive chain 48. The conveyor drum support 49 locates the belt 46 and drum 47 in proper operative position and also acts as a support assembly for the cutter assembly braces 27.

Referring again to the extruding head assembly 20, it will be seen that the rotary distributor 21 is supported in operative position within split ring brass bearings 56 which are enclosed within a support foundation that comprises upper foundation half 57 and lower foundation half 58. The foundation halves are suitably secured about bearings 56 by through bolts 59. A suitable support structure, or table 60, is provided to carry the extruder head assembly in proper position. To connect the end of the rotary distributor to conduit 13 a rotating coupling nut 61 having an inwardly projecting bearing flange 62 is positioned about the conduit 13 until the flange 62 engages bearing ring 17 at which time the internal thread of the rotating coupling nut 61 is drawn up on threads 63 of the rotating distributor. The nut 61 is threaded upon the rotary distributor 21 until the thrust bearing 18 engages the rear face of the rotary distributor thereby closing off the opening between the distributor and the conduit 13 for all practical purposes. When the nut 61 is suitably positioned set screw 64 is then tightened to keep the rotating nut in a fixed relation with respect to the rotary distributor. Therefore, since the rotary distributor is adapted to rotate, the only contact it has with conduit 13 is through the brass thrust washer 18 and brass bearing rings 17 which provide bearing surfaces for relative rotative movement between the conduit and the rotary distributor. Positioned approximately midway of the length of the rotary distributor is a drive sprocket 65 which is adapted to be driven by the rotary distributor drive chain 66 powered by drive motor 67 whose output is taken from pulley 68 and then transferred by drive belt 69 to the input shaft 70 of a suitable gear reduction mechanism 71 the resulting power is transmitted by the gear reduction output shaft 72 to the drive chain 66.

The stationary extruding head 22 is operatively fixed to the rotary distributor 21 by means of a stationary coupling nut 73, which is similar to the nut 61. Stationary coupling nut 73 has an inwardly extending flange 74 which contacts bearing ring 75 that is positioned against shoulder 76 of the rotary distributor. On the opposite side of shoulder 76 a beveled thrust washer 77 takes the rotating stress between rotary distributor 21 and extruder head 22. To maintain the parts in spaced relation, nut 73 is drawn upon threads 78 of the extruder head to a degree that engages the rear face of the extruder head against the thrust washer 77 and permits contact between inwardly extending flange 74 and bearing ring 75. Stationary coupling nut 73 provides support for extruder head 22 and is held against rotative movement by nut support 79 which is adjustably secured to table 60 by a suitable fastener 80.

Positioned near the forward end of the rotary distributor 21 and fixed against relative movement therewith is a thin cylindrical vane support 85 having radial inwardly extending vanes 86 which are equally spaced in an angular array and project perpendicular to the longitudinal axis of the rotary distributor. As is to be noted from FIGURES 5 and 6 the vanes 86 meet at a common center which is the geometric center of the cylindrical vane support 85. The rearmost ends of the extruding tubes 23 terminate at the center of head 22 by having a common extension forming a common conical center portion 87, the apex of which projects along the longitudinal center line of the extruder head. Affixed within the extruder head is a thin cylindrical distributing vane support 88 which has radial inwardly extending vanes 89 that have equal angular spacing and which terminate near the center of the distributing vane support 88 upon a truncated conical member 90 that is adapted to mate with the common conical center 87 of the tubes 23. Further, it has been found that to satisfactorily perform the intended function of the present invention, the vane support 85 should have a numerical quantity of vanes 86 that equal in number the vanes 89 of the distributing vane support 88.

The apparatus used in the process of the present invention is shown in FIGURE 7 and includes a large water jacketed kettle 91 in which hot water is admitted to the interior 92 of the kettle jacket in order that an even heat will be transferred about the entire kettle. If the process is to be used to make chocolate candy, then the chocolate would be placed into the kettle 91, melted and then there would be suitable nut meats or other additives added to the chocolate mixture. Once the mixture is basically homogeneous it is then transferred from the heated kettle 91 through pipe 93 by the force of pump 94 to a heat exchanger, indicated by numeral 95. The heat exchanger may be of any suitable type such as a Girdler Votator and is used to bring the molten mix from a relatively high temperature to a temperature at which the chocolate mixture will "set up" or become a thickened mixture in a plastic condition. In other words the heat exchanger cools the mixture into a mass that has a relatively plastic condition, at which time the mixture is then forced out of the heat exchanger through pipe 96 to a Y junction 97 through which it may be admitted to one of the two holding chambers 97, 98 by closing one of the valves 99, 100 and opening the other. Once one of the holding chambers is full of the mixture it is allowed to stand under constant temperature until any unusually large lumps in the mixture have mellowed out or, in other words, have been reduced in size so as to be homogeneous with the surrounding mixture. From the holding chambers 97, 98 the now uniform plastic mass flows through conduits 11 to the Y junction 12 and thence into the extruder head asesmbly 20. Upon flowing into the rotary distributor 21, which is being revolved at a speed of approximately 4 r.p.m., the plastic mass has imparted to it a revolving action and tends to follow the speed of the revolving distributor 21. Because of the relatively low speed of the distributor 21 and its large internal diameter only the peripheral portion of the mass in contact with the internal portion of the distributor will be rotated to any degree and, therefore, there will be a slippage between the center of the mass and the periphery thereof. Due to any number of factors, such as air leaks in the pumping system, there may develop voids within the length of the pumped mass and, therefore, once the mass flows through the extruder head 22 an equal portion of the mixture will not be delivered to each and every extruding tube 23 it if were not for the provisions of the present invention.

Therefore, an especially important feature of this invention is the provision of rotating vanes 86 and distributing vanes 89 which act to force an equal distribution of the flowing mixture to each extruding tube 23 in order that ultimately each of the extruded candy bars will be of equal size and weight. To accomplish this purpose the rotary vanes 86 will impart a constant rotation to the entire flowing plastic mass and will pass any voids that may occur evenly about the distributing vanes 89. In effect the vanes 89 act as a plurality of distributing cutters in that each one will take a portion of an occurring void and will prevent the entire void from being pushed through one extruding tube. To compensate for the voids that may occur in each extruding tube the common conical center 87 decreases the outlet flow size of the mass and tends to compress the flowing mass of material into each extruding tube 23. In this manner the voids will be eliminated in each tube 23 and a constant amount will be extruded therefrom.

From the extruding orifices 23a the mass then flows through the flexible distributing tubes 24 and thence through the extruding nozzles 25 which, as can be seen in FIGURE 2, terminate with a rectangular cross section, however, the nozzles 25 may terminate in any desired cross section and need not be rectangular. From the nozzles the extruded mixture passes upon the extrusion receiving plate 35 which, as noted before, is heated in order to prevent the extruded material from sticking and congealing upon the plate. As the extruded material moves forward it will come into contact with the rear face of a cutter blade 32, and, since the cutting wheels 30 are freely rotatable, the foward force of the material will rotate the cutting wheel and subsequently bring the next cutting blade into contact with the extruded material, thereby cutting it into any desired size.

The now cut candy bars 36 will pass from between the blades 32 and the cutting wheel and by gravity fall upon conveyor belt 46 which is operated at a speed slightly faster than the movement of the extruded material so as to support the now cut candy bars 36. In as much as the cutting wheels 30 are rotated by the flow of the extruded material the material may be removed from the nozzles 25 at any desired speed without effecting the character or size of the finished product. As the cutting wheels 30 continue to rotate in a counter clockwise manner, shown in FIGURE 2, the blades 32 are heated to a desired degree so as to prevent adherence of the plastic mixture on the blades 32 and the periphery of the wheels 30. This heating is formed by means of the lamp 37 containing the heating elements 38. The lamp 37 is so shaped and shielded to provide the radiated heat in only the desired direction of the cutting wheels 30 so as not to tend to melt the moving candy bars 36 as they pass under the lamp.

Once the candy bars 36, or for that matter any other material that is suitable to be extruded by the present invention, is carried down the conveyor belt, it is anticipated than any conventional processing procedures may be accomplished in order to make a final product of the extruded material.

A specific example of the process used in the making of chocolate candy is as follows:

A desired quantity of chocolate, nut meats, and vegetable fat is allowed to become basically homogeneous in a suitable heated container such as the water-jacketed kettle 91. The exact quantity of the final mixture or of the individual components is relatively unimportant since these figures are determined by what composition the end product is to take. The mixture is held in the kettle 91 at a temperature in the range of 100° F. to 105° F. until the components are well mixed and then the mixture is pumped from the kettle 91 by pump 94 into a heat exchanger 95 and there "super-cooled" to a temperature in the range of 68° F. to 69° F. From the heat exchanger 95 the mixture is then forced into one of two holding chambers 97 or 98 and kept at a constant temperature in the range of 68° F. to 69° F. to allow any unusually large lumps to "mellow" out of the mixture. Upon the opening of the valve 99 or 100 which corresponds to the holding chamber 97 or 98 in which the "mellowed" mixture rests, the mixture is forced out of the chamber by the force of the pump 94 delivering another charge of the mixture to the chamber. From the chamber the mixture is then forced through the rotary distributor 21 and distributed equally to the extruder head 22, extruded through tubes 23 to nozzles 25 and then cut and conveyed away in the manner described.

While the above example has shown specific examples of temperatures for using chocolate mixtures in the present invention, it should be understood that mixtures of substances such as waxes, butter, margarine, ice cream or any other material that can be pumped and brought to a plastic consistency by the use of suitable temperatures may be used in the apparatus of the present invention and operated upon by the novel method herein presented.

The present invention has shown a particularly novel method and apparatus for obtaining extrusions of a highly abrasive material in a plastic condition in which the problems noted earlier do not occur. Further, an extremely novel extruding apparatus has been shown where multiple lines may be extruded from a single extrusion head wherein the problem of dealing with voids in a material do not occur because of the means employed herein to meter small portions of the void to each extrusion orifice thereby subsequently eliminating the void completely.

While I have particularly shown and described one particular embodiment of the invention, it is distinctly understood that the invention is not limited thereto but that modifications may be made within the scope of the invention and such variations as are covered by the scope of the appended claims.

What is claimed is:

1. In an apparatus for effecting substantially void-free extrusions of plastic substances through multiple orifices, the combination of a conduit, a pump means for supplying a pressurized flow of the plastic substance through the conduit, an extruding assembly connected to the conduit adapted to receive the flow of the plastic substance, the extruding assembly comprising a rotating member and a stationary member connected in tandem with one another, the stationary member having a plurality of extruding tubes extending in a diverging relation from its forward end, distributing tubes having one end connected to the extruding tubes, extruding nozzles affixed to the other end of the distributing tubes, a rotary cutting means operatively positioned in relation to the nozzles to cut the extruded substance into predetermined sizes, and conveying means underlying the nozzles to receive and carry away the cut extrusions.

2. An extruder for effecting substantially void-free extrusions of plastic substances through multiple orifices comprising, a rotary distributor having an inlet end and an outlet end, the inlet end being externally threaded to effect rotative coupling with a supply means, a circular passage through the rotary distributor to accommodate the movement of a plastic substance, an extruder head mounted in juxtaposition with the outlet end of the rotary distributor, drive means mounted about the outer periphery of the rotary distributor adapted to provide rotation thereto relative to the extruder head, means located adjacent the outlet end of the rotary distributor for imparting rotation to the flowing plastic substance, the extruder head having a plurality of extruding tubes diverging from the longitudinal center line of the extruder head, means located within the extruder head to evenly distribute the plastic substance to each of the extruding tubes.

3. An extruder for effecting substantially void-free extrusions of plastic substances through multiple orifices comprising, a rotary distributor having an inlet end and an oulet-end the inlet end being externally threaded to effect rotative coupling with a supply means, a circular passage through the rotary distributor to accommodate the movement of a plastic substance, an extruder head mounted in juxtaposition with the outlet end of the rotary distributor, means coupling the rotary distributor with the extruder head including a coupling nut affixed to the extruder head and having a portion overlying the outlet end of the rotary distributor, the overlying portion having an inwardly projecting peripheral flange, a shoulder on the rotary distributor and lying between the inwardly projecting peripheral flange and the outlet end, bearing means in intimate contact with the peripheral flange and the shoulder, drive means mounted about the outer periphery of the rotary distributor adapted to provide rotation thereto relative to the extruder head, means located adjacent the outlet end of the rotary distributor for imparting rotation to the flowing plastic substance, the extruder head having a plurality of extruding tubes diverging from the longitudinal center line of the extruder head, means located within the extruder head to evenly distribute the plastic substance to each of the extruding tubes.

4. An extruder for effecting substantially void-free extrusions of plastic substances through multiple orifices comprising, a rotary distributor having an inlet end and an outlet end, the inlet end being externally threaded to effect rotative coupling with a supply means, a circular passage through the rotary distributor to accommodate the movement of a plastic substance, an extruder head mounted in juxtaposition with the outlet end of the rotary distributor, drive means mounted about the outer periphery of the rotary distributor adapted to provide rotation thereto relative to the extruder head, means located adjacent the outlet end of the rotary distributor for imparting rotation to the flowing plastic substance, the extruder head having a plurality of extruding tubes, the extruding tubes being of equal angular spacing and diverging outwardly at an acute angle from the longitudinal center line axis of the extruder head and terminating forwardly of the extruder head in a common vertical plane, means located within the extruder head to evenly distribute the plastic substance to each of the extruding tubes.

5. An extruder for effecting substantially void-free extrusions of plastic substances through multiple orifices comprising, a rotary distributor having an inlet end and an outlet end, the inlet end being externally threaded to effect rotative coupling with a supply means, a circular passage through the rotary distributor to accommodate the movement of a plastic substance, an extruder head mounted in juxtaposition with the outlet end of the rotary distributor, drive means mounted about the outer periphery of the rotary distributor adapted to provide rotation thereto relative to the extruder head, means located adjacent the outlet end of the rotary distributor for imparting rotation to the flowing plastic substance, the extruder head having a plurality of extruding tubes, the extruding tubes being of equal angular spacing and diverging outwardly at an acute angle from the longitudinal center line axis of the extruder head and terminating forwardly of the extruder head in common vertical plane, the extruding tubes terminating rearwardly in a converging juncture in the extruder head, portions of the extruding tubes at the converging juncture forming a common conical center within the extruder head, the apex of the conical center projecting rearwardly of the center line axis of the extruder head, means located within the extruder head to evenly distribute the plastic substance to each of the extruding tubes.

6. An extruder for effecting substantially void-free extrusions of plastic substances through multiple orifices comprising, a rotary distributor having an inlet end and an outlet end, the inlet end being externally threaded to effect rotative coupling with a supply means, a circular passage through the rotary distributor to accommodate the movement of a plastic substance, an extruder head mounted in juxtaposition with the outlet end of the rotary distributor, means coupling the rotary distributor with the extruder head including a coupling nut affixed to the extruder head and having a portion overlying the outlet end of the rotary distributor, the overlying portion having an inwardly projecting peripheral flange, a shoulder on the rotary distributor and lying between the inwardly projecting peripheral flange and the outlet end, bearing means in intimate contact with the peripheral flange and the shoulder, drive means mounted about the outer periphery of the rotary distributor adapted to provide rotation thereto relative to the extruder head, means located adjacent the outlet end of the rotary distributor for imparting rotation to the flowing plastic substance, the extruder head having a plurality of extruding tubes, the extruding tubes being of equal angular spacing and diverging outwardly at an acute angle from the longitudinal center line axis of the extruder head and terminating forwardly in a common vertical plane, the extruding tubes terminating rearwardly in a converging juncture in the extruder head, portions of the extruding tubes at the converging juncture forming a common conical center within the extruder head, the apex of the conical center projecting rearwardly on the center line axis of the extruder head, means located within the extruder head to evenly distribute the plastic substance to each of the extruding tubes.

7. In an extruder for effecting substantially void-free extrusions of plastic substances, the combination recited in claim 2 wherein the means for imparting rotation to the plastic substance comprises a thin cylindrical vane support fixed in the circular passage, a plurality of radial inwardly extending vanes affixed to the vane support, the vanes being mounted equally spaced in an angular array projecting perpendicular to the longitudinal center line axis of the circular passage and meeting at the geometric center of the vane support.

8. In an extruder for effecting substantially void-free extrusions of plastic substances, the combination recited in claim 2 wherein the means to evenly distribute the plastic substance between the extruding tubes comprises a thin cylindrical distributing vane support fixed in the extruder head, a truncated conical center member located within the confines of the distributing vane support, a plurality of radial inwardly extending vanes affixed to the distributing vane support in an angular array and terminating upon the truncated conical center member, the truncated conical center member adapted to mate with the common conical center of the extruding tubes.

9. An extruder for effecting substantially void-free extrusions of plastic substances through multiple orifices comprising, a rotary distributor having an inlet end and an outlet end, the inlet end being externally threaded to effect rotative coupling with a supply means, a circular passage through the rotary distributor to accommodate the movement of a plastic substance, an extruder head mounted in juxtaposition with the outlet end of the rotary distributor, drive means mounted about the outer periphery of the rotary distributor adapted to provide rotation thereto relative to the extruder head, means located adjacent the outlet end of the rotary distributor for imparting rotation to the flowing plastic substance comprising a thin cylindrical vane support fixed in the circular passage, a plurality of radial inwardly extending vanes affixed to the vane support, the vanes being mounted equally spaced in an angular array projecting perpendicular to the longitudinal center line axis of the circular passage and meeting at the geometric center of the vane support, the extruder head having a plurality of extruding tubes, the extruding tubes being of equal angular spacing and diverging outwardly at an acute angle from the longitudinal center line axis of the extruder head and terminating forwardly in a common vertical plane, the extruding tubes terminating rearwardly in a converging juncture in the extruder head, portions of the extruding tubes at the converging juncture forming a common conical center within the extruder head, the apex of the conical center projecting rearwardly on the center line axis of the extruder head, means located within the extruder head to evenly distribute the plastic substance to each of the extruding tubes.

10. An extruder for effecting substantially void-free extrusions of plastic substances through multiple orifices comprising, a rotary distributor having an inlet end and an outlet end, the inlet end being externally threaded to effect rotative coupling with a supply means, a circular passage through the rotary distributor to accommodate the movement of a plastic substance, an extruder head mounted in juxtaposition with the outlet end of the rotary distributor, drive means mounted about the outer periphery of the rotary distributor adapted to provide rotation thereto relative to the extruder head, means located adjacent the outlet end of the rotary distributor for imparting rotation to the flowing plastic substance, the extruder head having a plurality of extruding tubes, the extruding tubes being of equal angular spacing and diverging outwardly at an acute angle from the longitudinal center line axis of the extruder head and terminating forwardly of the extruder head in a common vertical plane, the extruding tubes terminating rearwardly in a converging juncture in the extruder head, portions of the extruding tubes at the converging juncture forming a common conical center within the extruder head, the apex of the conical center projecting rearwardly on the center line axis of the extruder head, means located within the extruder head to evenly distribute the plastic substance to each of the extruding tubes comprising a thin cylindrical distributing vane support fixed in the extruder head, a truncated conical center member located within the confines of the distributing vane support, a plurality of radial inwardly extending vanes affixed to the distributing vane support in an angular array and terminating upon the truncated conical center member, the truncated conical center member adapted to mate with the common conical center of the extruding tubes.

11. The method of mixing and extruding chocolate in a plastic state which comprises: introducing the chocolate in a heated receptacle, heating the chocolate to a temperature in the range of 100–105 degrees Fahrenheit in order to form a pumpable mixture, pumping the mixture to a heat exchanger, cooling the mixture to a temperature in the range of 68–69 degrees Fahrenheit in order to bring the mixture to a plastic consistency and thereafter introducing the plastic mixture into a holding chamber to allow lumps to be reduced in size to form a homogeneous mixture, causing the mixture to flow from the holding chamber into a rotary distributor, dividing the flowing plastic mixture into substantially equal parts and distributing the equal parts to a multiple outlet extruder head and thereafter extruding the mixture, cutting the extruded mixture into desired sizes.

References Cited by the Examiner
UNITED STATES PATENTS

| | | | |
|---|---|---|---|
| 1,432,918 | 10/1922 | Steely | 107—4.7 |
| 1,796,934 | 3/1931 | Laureys | 107—4.7 |

WALTER A. SCHEEL, *Primary Examiner.*

J. SHEA, *Assistant Examiner.*